United States Patent
Tang et al.

(10) Patent No.: US 10,877,202 B2
(45) Date of Patent: Dec. 29, 2020

(54) SURFACE LIGHT SOURCE ASSEMBLY AND REFRIGERATOR HAVING THE SAME

(71) Applicant: QINGDAO HAIER CO., LTD., Qingdao (CN)

(72) Inventors: Haidong Tang, Qingdao (CN); Shidong Li, Qingdao (CN); Guangrui Wu, Qingdao (CN); Ming Wang, Qingdao (CN); Ning Wang, Qingdao (CN); Falin Yang, Qingdao (CN)

(73) Assignee: QINGDAO HAIER CO., LTD., Qingdao (CN)

( * ) Notice: Subject to any disclaimer, the term of this patent is extended or adjusted under 35 U.S.C. 154(b) by 0 days.

(21) Appl. No.: 16/611,465

(22) PCT Filed: Dec. 20, 2018

(86) PCT No.: PCT/CN2018/122303
§ 371 (c)(1),
(2) Date: Nov. 6, 2019

(87) PCT Pub. No.: WO2019/120243
PCT Pub. Date: Jun. 27, 2019

(65) Prior Publication Data
US 2020/0142122 A1 May 7, 2020

(30) Foreign Application Priority Data

Dec. 23, 2017 (CN) .......................... 2017 1 1409543
Dec. 23, 2017 (CN) .......................... 2017 1 1415053

(51) Int. Cl.
*F21V 8/00* (2006.01)
*F25D 27/00* (2006.01)

(52) U.S. Cl.
CPC .......... *G02B 6/0058* (2013.01); *F25D 27/00* (2013.01)

(58) Field of Classification Search
CPC ...................................................... F25D 27/00
See application file for complete search history.

(56) References Cited

U.S. PATENT DOCUMENTS

2011/0194308 A1 8/2011 Lin
2012/0106129 A1* 5/2012 Glovatsky ............ G02B 6/0095
362/92

(Continued)

FOREIGN PATENT DOCUMENTS

CN 2512074 Y 9/2002
CN 102147078 A 8/2011

(Continued)

*Primary Examiner* — Anabel Ton
(74) *Attorney, Agent, or Firm* — Cheng-Ju Chiang

(57) ABSTRACT

The present invention discloses a surface light source assembly and a refrigerator having the same. The surface light source assembly comprises: a light source and a light guide plate which is vertically illuminated by the light source, wherein the light source is provided along a first side of the light guide plate; a plurality of light guide spots is provided at a front surface of the light guide plate, a through hole is vertically formed in the middle of the light guide plate; a first region is provided at a position close to the upper edge of the through hole, the diameter and density of the light guide spots in the first region are less than the diameter and density of the light guide spots in the peripheral region of the first region.

12 Claims, 4 Drawing Sheets

(56) References Cited

U.S. PATENT DOCUMENTS

| | | | | |
|---|---|---|---|---|
| 2013/0176317 A1* | 7/2013 | Li | ................... | G02B 6/0035 |
| | | | | 345/501 |
| 2015/0023000 A1* | 1/2015 | Kendall | ................. | F25D 27/00 |
| | | | | 362/92 |
| 2016/0067931 A1* | 3/2016 | Yang | ................... | B29C 33/3842 |
| | | | | 428/156 |
| 2020/0064541 A1* | 2/2020 | Jeon | .................... | G02B 6/0036 |

FOREIGN PATENT DOCUMENTS

| | | |
|---|---|---|
| CN | 103322763 A | 9/2013 |
| KR | 10-2012-0097550 A | 9/2012 |
| WO | 2011/019589 A1 | 2/2011 |

\* cited by examiner

SURFACE LIGHT SOURCE ASSEMBLY AND REFRIGERATOR HAVING THE SAME

The present application is a 35 U.S.C. §371 National Phase conversion of International (PCT) Patent Application No. PCT/CN2018/122303, filed on Dec. 20, 2018, which claims priority of Chinese Patent Application No. 201711409543.9, titled "surface light source assembly and refrigerator having the same", filed on Dec. 23, 2017, and Chinese Patent Application No. 201711415053.X, titled "refrigerating compartment and refrigerator having the same", filed on Dec. 23, 2017, the disclosures of which are incorporated herein by reference in its entirety. The PCT International Patent Application was filed and published in Chinese.

TECHNICAL FIELD

The present invention pertains to the field of household appliance technologies, and in particular, relates to a surface light source assembly and a refrigerator having the same.

BACKGROUND

Currently, a lighting lamp at the top of a refrigerating compartment in a refrigerator cannot meet illumination demands anymore, because it can only illuminate part of a space. The lamplight would be blocked and shadows would be created at an edge or lower part of the compartment if more articles are placed on a shelf, which is not convenient for a user to look for or take out food.

Therefore, currently, there exists a surface light source assembly which may be provided on a rear wall of the compartment, a light guide plate is provided on the rear wall of the compartment, and a light source is used to vertically illuminate the light guide plate, such that the entire light guide plate emits uniform and soft light, which may illuminate the whole compartment. However, for some super-wide refrigerators, a through hole is required to be formed in the middle of the light guide plate to fix some devices on the rear wall of the compartment therethrough. Nevertheless, after the through hole is formed, a part which is too bright or too dark may appear on the light guide plate around the through hole, thereby creating non-uniform light rays on the entire light guide plate, and deteriorating lighting effects.

SUMMARY

An object of the present invention is to provide a surface light source assembly and a refrigerator having the same.

In order to achieve the above-mentioned object, an embodiment of the present invention provides a surface light source assembly, provided in a refrigerating compartment of a refrigerator, comprising: a light source and a light guide plate which is vertically illuminated by the light source, wherein the light source is provided along a first side of the light guide plate; a plurality of light guide spots is provided at a front surface of the light guide plate, a through hole is vertically formed in the middle of the light guide plate, and comprises an upper edge close to the light source and a lower edge away from the light source; a first region is provided at a position of the front surface of the light guide plate close to the upper edge of the through hole, the diameter of each light guide spot in the first region is less than that of each light guide spot in the peripheral region of the first region, and the density of the light guide spots in the first region is less than that of the light guide spots in the peripheral region of the first region; a second region is provided at a position of the front surface of the light guide plate close to the lower edge of the through hole, the diameter of each light guide spot in the second region is greater than that of each light guide spot in the peripheral region of the second region, and the density of the light guide spots in the second region is less than that of the light guide spots in the peripheral region of the second region.

As a further improvement of one embodiment of the present invention, the diameter of each light guide spot in the first region gradually decreases in a direction away from the light source.

As a further improvement of one embodiment of the present invention, the diameter of each light guide spot in the second region gradually increases in a direction away from the light source.

As a further improvement of one embodiment of the present invention, the surface light source assembly further comprises a supplemental light source, the light guide plate comprises a second side opposite to the first side, and the supplemental light source is provided along the second side of the light guide plate.

As a further improvement of one embodiment of the present invention, the diameter of the light guide spots on the region, other than the first region and the second region, of the front surface of the light guide plate gradually increases in a direction away from the light source.

As a further improvement of one embodiment of the present invention, the density of the light guide spots on the region, other than the first region and the second region, of the front surface of the light guide plate gradually increases in a direction away from the light source.

As a further improvement of one embodiment of the present invention, the light guide plate further comprises a rear surface opposite to the front surface; the edge of the through hole is provided with a first anti-collision frame, and the first anti-collision frame extends from the edge of the through hole of the front surface of the light guide plate towards the through hole and covers the edge of the through hole of the rear surface of the light guide plate.

As a further improvement of one embodiment of the present invention, the light guide plate further comprises two third sides adjacent to the first side, and a second anti-collision frame is provided at the third sides in a lengthwise direction, and the second anti-collision frame extends from the edge of the front surface of the light guide plate towards the third sides and covers the edge of the rear surface of the light guide plate.

Another embodiment of the present invention provides a refrigerator, wherein the refrigerator comprises the surface light source assembly as mentioned above, the surface light source assembly mounted in the refrigerating compartment.

As a further improvement of one embodiment of the present invention, the refrigerating compartment further comprises at least two cantilever shelves arranged side by side, and a connector is provided at two ends at the back of the cantilever shelf respectively; the rear wall of the refrigerating compartment is provided with a through hole fixing element at a position corresponding to the through hole, and the rear wall is provided with a left side fixing element and a right side fixing element respectively corresponding to the two sides of the light guide plate; the connector at one end at the back of one of the cantilever shelves is connected with the left side fixing element, the connector at the other end is connected with the through hole fixing element; the connector at one end at the back of the other of the cantilever shelves is connected with the through hole fixing element, and the connector at the other end is connected with the right side fixing element, to mount the cantilever shelves in the refrigerating compartment.

As a further improvement of one embodiment of the present invention, the connector is a fastener, a slot is arranged on the through hole fixing element, the left side fixing element and the right side fixing element respectively, and the fastener may be fastened or disconnected with the slot.

As a further improvement of one embodiment of the present invention, a plurality of slots is arranged on the through hole fixing element, the left side fixing element and the right side fixing element respectively at intervals in the vertical direction; when the cantilever shelves are horizontally placed, the fasteners may be fastened to the through hole fixing element respectively, any one of the plurality of slots on the left side fixing element and the right side fixing element limits the vertical height of the cantilever shelves; when the front ends of the cantilever shelves are lifted up, the fasteners are disconnected with the slots, and the cantilever shelves are moveable vertically.

As a further improvement of one embodiment of the present invention, when the fasteners on the connector are mated and connected with the slots of the through hole fixing element, the sizes of the slots in the horizontal direction are larger than a sum of sizes of the fasteners in the horizontal direction.

Compared with a prior art, the surface light source assembly according to the present invention adjusts diameters and densities of light guide spots at an edge of a through hole of the light guide plate, so that light rays in a first region are not too bright, light rays in a second region do not create shadows, the first and second regions have the same light brightness as a peripheral region, and eventually the light rays of the entire light guide plate are uniform, which achieves integral lighting effects of the refrigerator.

DETAILED DESCRIPTION

Figure 1:
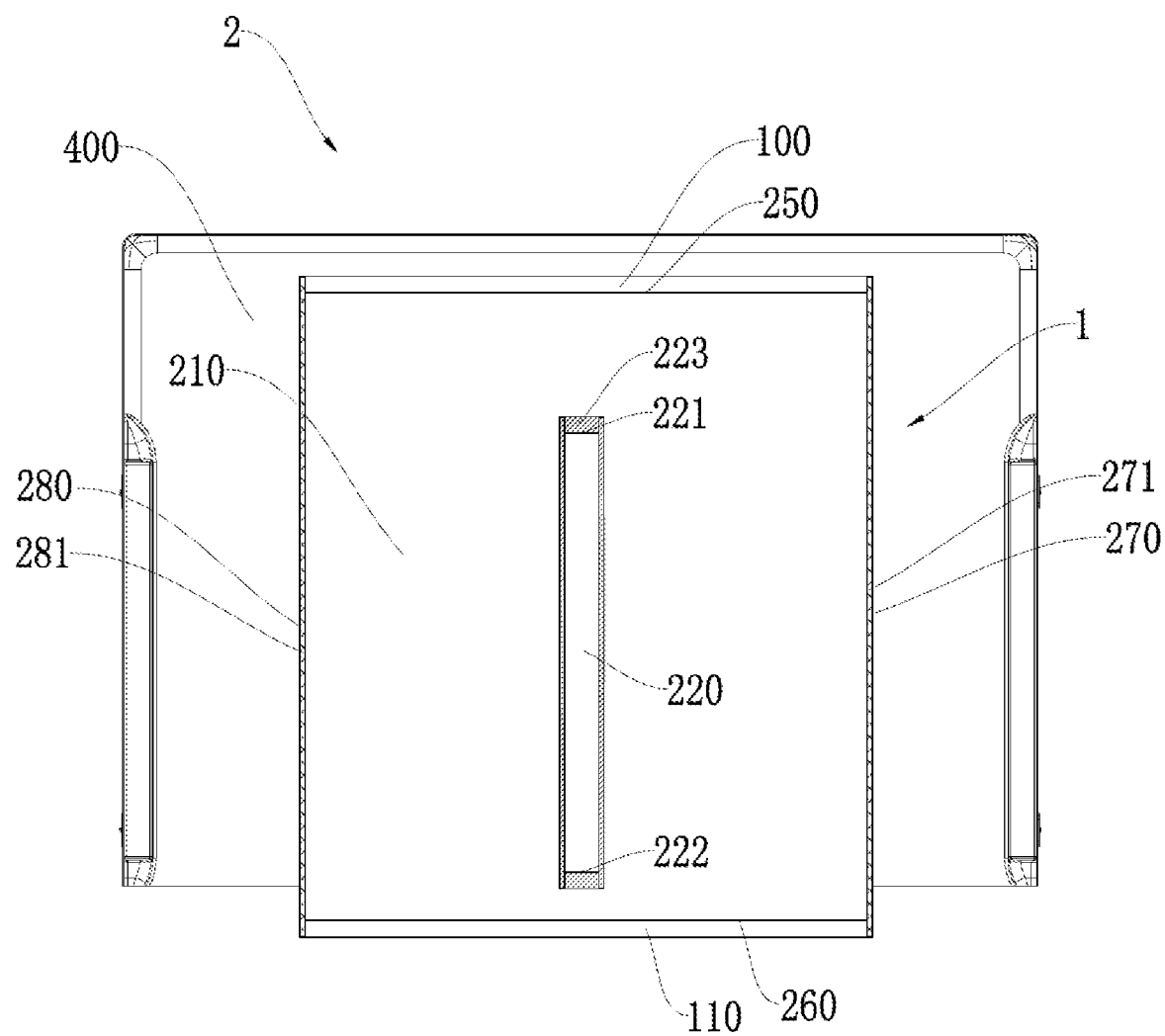
FIG. 1 is a schematic structural diagram of a surface light source assembly mounted in an inner liner of a refrigerator according to embodiments of the present invention.

The present invention will be described below in detail in combination with specific embodiments illustrated in drawings. However, these embodiments have no limitations on the present invention, and any transformations of structure, method, or function made by persons skilled in the art according to these embodiments fall within the protection scope of the present invention.

It should be understood that the terms expressive of spatial relative positions, such as "upper", "above", "lower", "below", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings.

Figure 2:
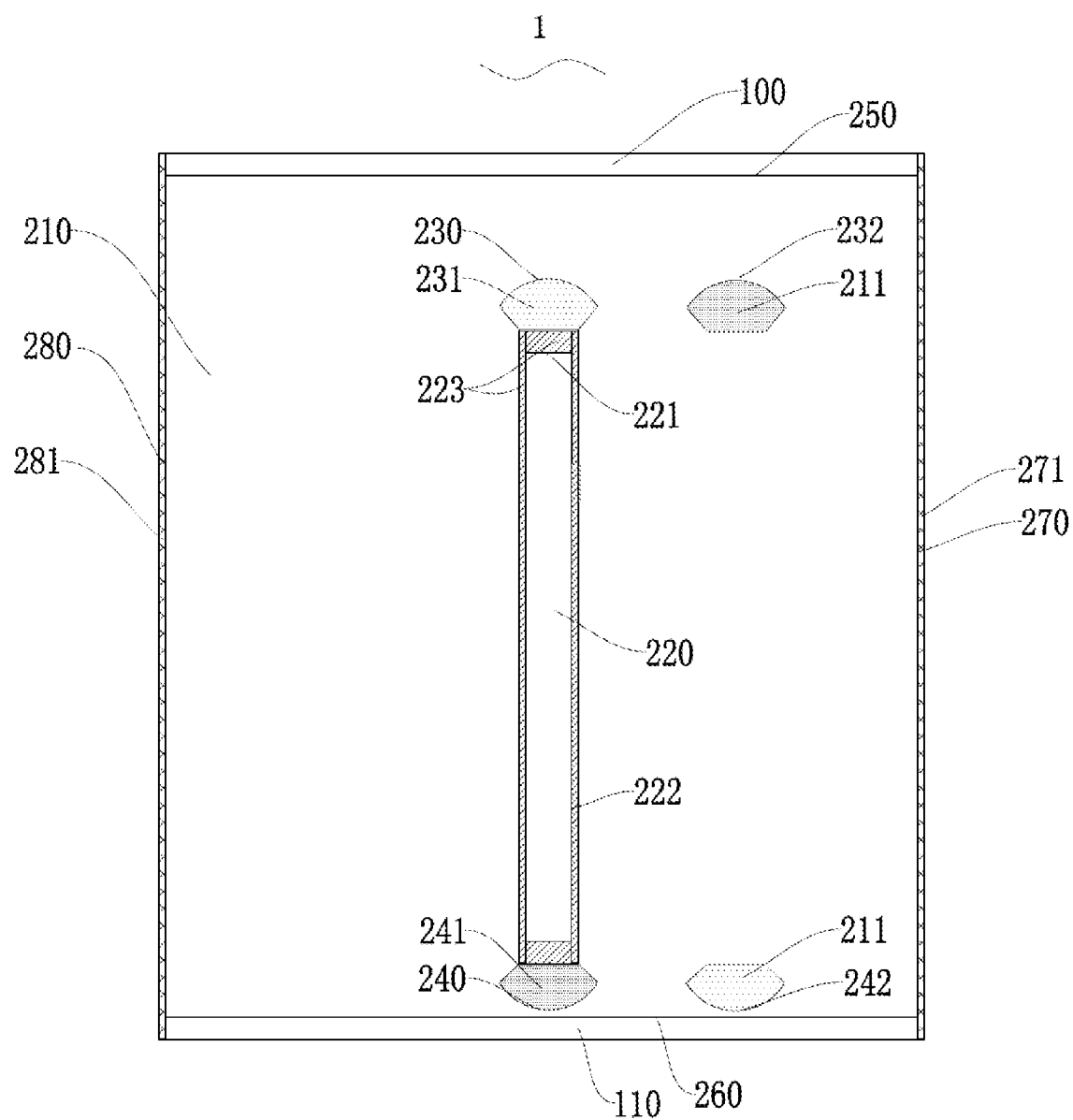
FIG. 2 is a schematic structural diagram of the surface light source assembly according to embodiments of the present invention.
Figure 3:
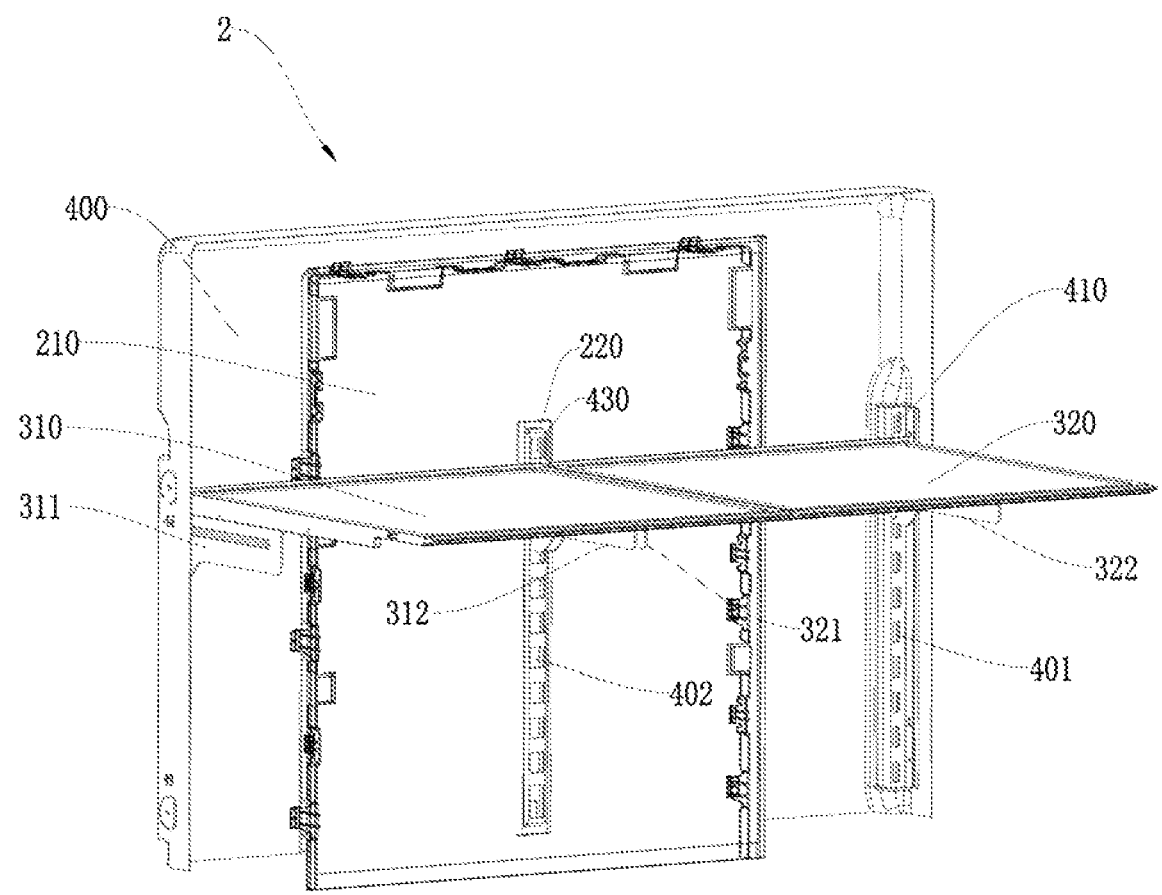
FIG. 3 is a schematic structural diagram of a cantilever shelf mounted in the inner liner of the refrigerator according to embodiments of the present invention.

As shown in FIGS. 1-3, a surface light source assembly according to a first embodiment of the present invention is introduced. In the present embodiment, the surface light source assembly 1 is provided in a refrigerating compartment 2 of a refrigerator, including: a light source 100 and a light guide plate 200 which is vertically illuminated by the light source 100, the light source 100 is provided along a first side 250 of the light guide plate 200; a plurality of light guide spots 211 is provided at a front surface 210 of the light guide plate 200. In the embodiments of the present invention, the light guide plate 200 is vertically provided in the refrigerating compartment 2 and covers a part of a rear wall of the compartment. The light source 100 is provided along an upper edge of the light guide panel 200 and vertically illuminates the light guide panel 200.

Currently, with respect to the surface light source assembly provided in the refrigerator, its light guide plate is generally an optical-grade acrylic/PC plate which has an extremely high reflectivity and does not absorb light. As plural small recesses, light guide spots are printed on the surface of the light guide plate by laser engraving, or the like. Next, the light source vertically illuminates the light guide plate, and at this point, each of the light guide spots is illuminated. At the light guide spot, reflected light will diffuse to various angles and finally be emitted from the surface of the light guide plate. In order to make the entire light guide plate uniformly emit light, usually, various light guide spots of different densities and sizes are provided on the light guide plate. In the embodiments of the present invention, before a through hole is formed on the light guide plate, the light guide spot on the light guide plate has such a change rule that a diameter of the light guide spot gradually increases and the density thereof gradually increases in a direction away from the light source.

In the embodiments of the present invention, a through hole 220 is vertically formed in the middle of the light guide plate 200, and includes an upper edge 221 close to the light source 100 and a lower edge 222 away from the light source 100. In a super-wide refrigerator, if a surface light source assembly is used for lighting, the through hole 220 is required to be formed in the middle of the light guide plate 200 to fix some devices (such as a cantilever shelf, etc.) on the rear wall of the compartment, etc. In the embodiments of the present invention, the through hole 220 is formed on a center line in a width direction of the light guide plate 200, at a lower part of the light guide plate 200.

In the embodiments of the present invention, a first region 230 is provided at a position of the front surface 210 of the light guide plate 200 close to the upper edge 221 of the through hole 220, the diameter of each light guide spot 231 in the first region 230 is less than that of each light guide spot 211 in the peripheral region of the first region 230, and the density of the light guide spots 231 in the first region 230 is less than that of the light guide spots 211 in the peripheral region of the first region 230.

After the through hole 220 is formed on the light guide plate, the light transmission is blocked by the upper edge 221 of the through hole 220. On the surface near the upper edge 221, the light cannot be transmitted continuously downward, and the brightness of this region is greater than that of the surrounding region. That is, one first region 230 is formed on the front surface 210 of the light guide plate 200, and the brightness of the first region 230 is greater than that of the peripheral region, thereby causing non-uniform brightness of the light guide plate 200. Therefore, the diameter and density of the light guide spots 231 in the first region 230 are required to be adjusted. In the embodiments of the present invention, the diameter of each light guide spot 231 in the first region 230 is adjusted to be less than the diameter of each light guide spot 211 in the peripheral region of the first region 230; the density of the light guide spots 231 in the first region 230 is adjusted to be less than the density of the light guide spot 211 in the peripheral region of the first region 230.

After the adjustments, the brightness of the first region 230 is the same as that of its peripheral region. Further, in order to make the light brightness in the first region 230 uniform, in the first region 230, the diameter of each light guide spot 231 also changes with a rule that the diameter of the light guide spot 231 gradually decreases in a direction away from the light source 100.

In the embodiments of the present invention, a second region 240 is provided at a position of the front surface 210 of the light guide plate 200 close to the lower edge 222 of the through hole 220, the diameter of each light guide spot 241 in the second region 240 is greater than that of each light guide spot 211 in the peripheral region of the second region 240, and the density of the light guide spots 241 in the second region 240 is less than that of the light guide spots 211 in the peripheral region of the second region 240.

After the through hole 220 is formed on the light guide plate 200, the light transmission is blocked by the upper edge 221 of the through hole 220, and the light cannot be transmitted continuously downward. A shadow region will appear at a surface near the lower edge 222 of the through hole 220. That is, one second region 240 is formed on the front surface 210 of the light guide plate 200, and no light rays in the second region 240 causes a shadow to be formed, thereby causing non-uniform brightness of the light guide plate 200. Therefore, the diameter and density of the light guide spots 241 in the second region 240 are required to be adjusted. In the embodiments of the present invention, the diameter of each light guide spot 241 in the second region 240 is adjusted to be greater than the diameter of each light guide spot 211 in the peripheral region of the second region 240; the density of the light guide spots 241 in the second region 240 is adjusted to be greater than the density of the light guide spots 211 in the peripheral region of the second region 240.

After the adjustments, the brightness of the second region 240 is the same as that of its peripheral region. Similarly, in order to make the light brightness in the second region 240 uniform, in the second region 240, the diameter of each light guide spot 241 also changes with a rule that the diameter of each light guide spot 241 gradually decreases in a direction away from the light source 100.

Further, the first region 230 is of a fan shape extending upwards from the upper edge 221 of the through hole 220, and the second region 240 is of a fan shape extending downwards from the lower edge 222 of the through hole 220.

In order to guarantee uniform brightness of the entire light guide plate 200, the change rule of the diameter and density of the light guide spots 221 on the region, other than the first and second regions 230 and 240, of the front surface 210 of the light guide plate 200 is the same as the change rule before the through hole 220 is formed on the light guide plate 200.

Preferably, a region at a periphery of the first region 230 is defined as a first contrast region 232, and the first contrast region 232 has the same vertical height and area as the first region 230. For example, in the first contrast region 232, an average diameter of the light guide spots 211 is 0.5 mm, and the density of the light guide spots 211 is 325 per square centimeter; at this point, an average diameter of the light guide spots 231 in the first region 230 is set to 0.2 mm, and the density of the light guide spots 231 is set to 152 per square centimeter.

Similarly, a region at a periphery of the second region 240 is defined as a second contrast region 242, and the second contrast region 242 has the same vertical height and area as the second region 240. For example, in the second contrast region 242, an average diameter of the light guide spots 211 is 0.2 mm, and the density of the light guide spots 211 is 152 per square centimeter; at this point, an average diameter of the light guide spots 241 in the second region 240 is set to 0.5 mm, and the density of the light guide spots 241 is set to 325 per square centimeter. Certainly, according to the light transmittance and the required characteristics of the light guide plate 200, the above-mentioned parameters may also be adjusted, and may be obtained after multiple tests.

It should be noted that, in order to illustrate the change of the light guide spots 231 in the first region 230 and the change of the light guide spots 241 in the second region 240, only the light guide spots 231 in the first region 230 and the light guide spots 211 in the first contrast region 232 as well as the light guide spots 241 in the second area 240 and the light guide spots 211 in the second contrast region 242 are shown in FIG. 2. Actually, in the embodiments of the present invention, all regions of the front surface 210 of the light guide plate 200 are provided with light guide spots, and light guide spots of other regions are not shown.

In an embodiment of the invention, the surface light source assembly 1 further includes a supplemental light source 110, the light guide plate 200 includes a second side 260 opposite to the first side 250, and the supplemental light source 110 is provided along the second side 260 of the light guide plate 200. A light bar identical to that at the top is provided at the lower side of the entire surface light source, for luminosity compensation with respect to the shadow of the second region 240.

The light guide plate 200 further includes a rear surface (not shown) opposite to the front surface 210; the edge of the through hole 220 is provided with a first anti-collision frame 223, and the first anti-collision frame 223 extends from the edge of the through hole 220 of the front surface 210 of the light guide plate 200 towards the through hole 220 and covers the edge of the through hole 220 of the rear surface of the light guide plate 200. The arrangement of the first anti-collision frame 223 at the edge of the through hole 220 may block the relatively bright region reflected by light rays, and may also avoid damages to the light guide plate 200 due to the collision with a connection structure of the device when some devices (such as a cantilever shelf, or the like) are mounted on the rear wall of the compartment through the through hole 220.

The light guide plate 200 further includes two third sides 270 adjacent to the first side 250, and a second anti-collision frame 271 is provided at the third sides 270 in a lengthwise direction, and the second anti-collision frame 271 extends from the edge of the front surface 210 of the light guide plate 200 towards the third sides 270 and covers the edge of the rear surface of the light guide plate 200. In the embodiments of the present invention, the third sides 270 are left and right sides of the light guide plate 200, and the arrangement of the second anti-collision frame 271 at left and right sides of the light guide plate 200 may also avoid damages to the light guide plate 200 due to the collision with a corresponding connection structure when some devices (such as a cantilever shelf, or the like) are mounted on the rear wall around the third sides 270.

In the embodiments of the present invention, the surface light source assembly further includes a diffusion plate and a reflector plate (not shown) laminated with the light guide plate, wherein the diffusion plate is disposed in a contact with the front surface, and the reflector plate is disposed in a contact with the rear surface. The structure and function of the diffusion plate and the reflector plate are known as a prior art and will not be repeated herein.

The embodiments of the present invention further disclose a refrigerator, including a refrigerating compartment 2, the refrigerator further including the above-mentioned surface light source assembly 1, mounted in the refrigerating compartment 2.

In the embodiments of the present invention, the refrigerating compartment 1 further includes at least two cantilever shelves arranged side by side, and a connector is provided at two ends at the back of the cantilever shelf respectively; the rear wall 400 of the refrigerating compartment 1 is provided with a through hole fixing element 430 at a position corresponding to the through hole 220, and the rear wall 400 is provided with a left side fixing element 410 and a right side fixing element 420 respectively corresponding to the two sides of the light guide plate 200.

In the embodiments of the present invention, two cantilever shelves arranged side by side are provided in the refrigerating compartment 2, respectively being first and second cantilever shelves 310 and 320; a first left connector 311 and a first right connector 312 are respectively provided at opposite ends of the back of the first cantilever shelf 310. The first left connector 311 is connected to the left side fixing element 410, and the first right connector 312 is connected to the through hole fixing element 430.

Correspondingly, a second left connector 321 and a second right connector 322 are respectively provided at opposite ends of the back of the second cantilever shelf 320. The second left connector 321 is connected to the through hole fixing element 430, and the second right connector 322 is connected to the right side fixing element 420. The first and second cantilever shelves 310 and 320 are connected to the through hole fixing element 430, the left side fixing element 410 and the right side fixing element 420 at the same height, such that the first and second cantilever shelves 310 and 320 may be horizontally mounted in the refrigerating compartment.

Thus, the first and second cantilever shelves 310 and 320 may be arranged side by side in the refrigerating compartment 2.

In the embodiments of the present invention, the first left connector 311, the first right connector 312, the second left connector 321 and the second right connector 322, having the same structure, are all fasteners, fixedly connected at the two ends of the back of cantilever shelves respectively.

A slot 401 is provided on the left side fixing element 410, and the first left connector 311 may be fastened or disconnected with the slot 401. Similarly, the slot 401 is provided on the right side fixing element 420, and the second right connector 322 may be fastened or disconnected with the slot 401; a slot 402 is provided on the through hole fixing element 430, and both of the first right connector 312 and the second left connector 321 may be fastened or detachably connected with the slot 402. Thus, the first and second cantilever shelves 310 and 320 may be detachably mounted on the rear wall 400 of the refrigerating compartment 2.

Further, the plurality of slots 401 are arranged on the left side fixing element 410 and the right side fixing element 420 respectively at intervals in the vertical direction. The plurality of slots 402 are arranged on the through hole fixing elements 430 at intervals in the vertical direction. The height of each of the slots 402 is the same as the height of each of the slots 401.

The first left connector 311 and the first right connector 312 of the first cantilever shelf 310 are respectively fastened with the slot 401 of the left side fixing element 410 and the slot 402 of the through hole fixing element 430, and so the first cantilever shelf 310 may be mounted into the refrigerating compartment 2.

The second left connector 321 and the second right connector 322 of the second cantilever shelf 320 are respectively fastened with the slot 402 of the through hole fixing element 430 and the slot 401 of the right side fixing element 420, and so the second cantilever shelf 320 may be mounted into the refrigerating compartment 2. When the second cantilever shelf 320 is mounted into the refrigerating compartment 2, the two cantilever shelves are mounted into the slots 401 and 402 with the same height, and thus they are kept in the same height and provided horizontally side by side.

When a front end of the first cantilever shelf 310 is lifted up, the first left connector 311 and the first right connector 312 are respectively disconnected with the slot 401 of the left side fixing element 410 and the slot 402 of the through hole fixing element 430, and the first cantilever shelf 310 is movable in the vertical direction.

Similarly, when a front end of the second cantilever shelf 320 is lifted up, the second left connector 321 and the second right connector 322 are respectively disconnected with the slot 402 of the through hole fixing element 430 and the slot 401 of the right side fixing element 420, and the second cantilever shelf 320 is movable in the vertical direction.

Therefore, when the user needs to adjust the size of the space defined by the shelf according to the different food volumes, the front ends of the first and second cantilever shelves 310 and 320 may be lifted up and moved up and down in the refrigerating compartment. After the required size of the space is determined, the front end of the first cantilever shelf 310 is laid flat, and the first left connector 311 and the first right connector 312 are respectively fastened with the slot 401 of the left side fixing element 410 and the slot 402 of the through hole fixing element 430; similarly, the front end of the second cantilever shelf 320 is laid flat, and the second left connector 321 and the second right connector 322 are respectively fastened with the slot 402 of the through hole fixing element 430 and the slot 401 of the right side fixing element 420, and thus the two cantilever shelves may be fixed in the refrigerating compartment.

Figure 4:
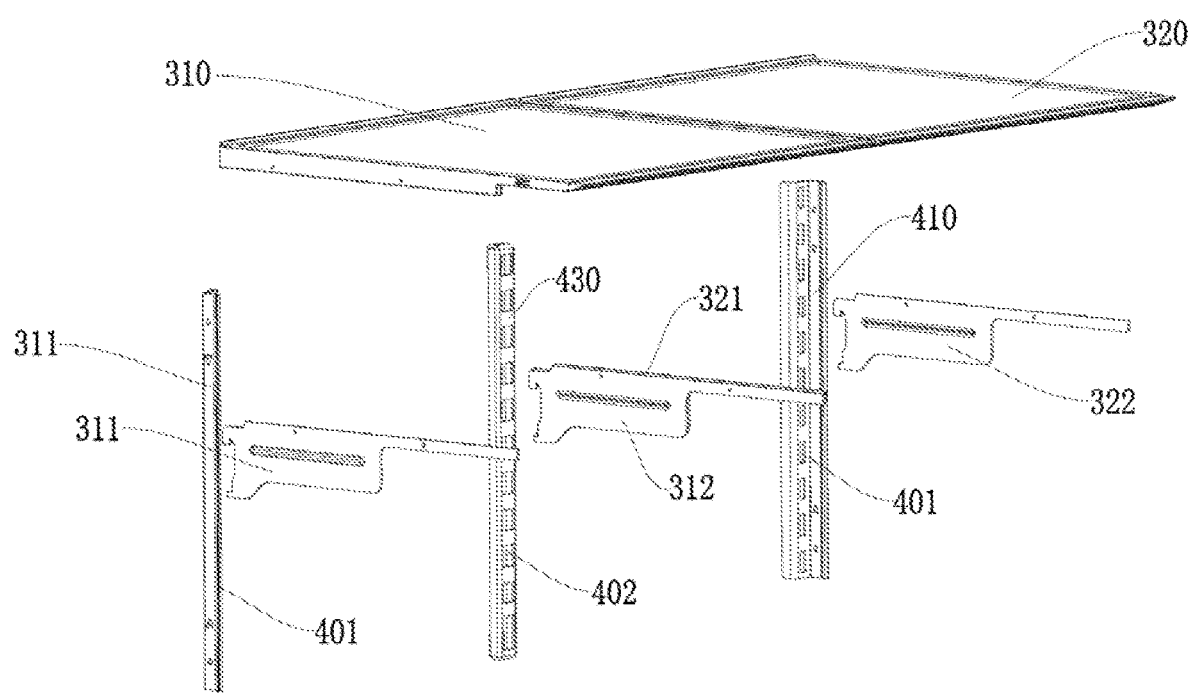
FIG. 4 is a schematic structural diagram of the cantilever shelf according to embodiments of the present invention.

As shown in FIG. 4, when the fasteners on the connector are mated and connected with the slots of the through hole fixing element, the sizes of the slots 402 in the horizontal direction are larger than a sum of sizes of the two fasteners in the horizontal direction. In order to enable both the first right connector 312 of the first cantilever shelf 310 and the second left connector 321 of the second cantilever shelf 320 to be fastened with the slot 402 of the through hole fixing element 430, the width of the slot 402 is required to be greater than a sum of thicknesses of the first right connector 312 and the second left connector 321 in the horizontal direction.

To sum up, the surface light source assembly 1 according to the present invention adjusts the diameter and density of the light guide spot at the upper and lower edges 221 and 222 of the through hole 220 of the light guide plate 200, so that light rays in the first region 230 are not too bright, the light rays in the second region 240 do not create shadows, the first and second regions 230 and 240 have the same light brightness as the peripheral region, and finally the light rays of the entire light guide plate 200 are uniform, which achieves overall lighting effects of the refrigerator. Further, the supplemental light source 110 is provided at the second side 260 of the light guide plate 200, for luminosity compensation with respect to the shadow of the second region 240. The edge of the through hole 220 is provided with a first anti-collision frame 223, for blocking the relatively bright region reflected by light rays, and also avoiding damages to the light guide plate 200 due to the collision with a connection structure of the device when some devices (such as a cantilever shelf, or the like) are mounted on the rear wall of the compartment through the through hole 220. The second anti-collision frame 271 is provided at the left and right sides of the light guide plate 200, also for avoiding damages to the light guide plate 200 due to the collision with a corresponding connection structure when some devices (such as a cantilever shelf, or the like) are mounted on the rear wall around the third sides. At the same time, the rear wall 400 of the refrigerating compartment 2 is provided with a through hole fixing element 430 at a position corresponding to the through hole 220, and the rear wall 400 is provided with a left side fixing element 410 and a right side fixing element 420 respectively corresponding to the two sides of the light guide plate 200, such that the connectors at the back of the cantilever shelves arranged side by side may be connected with the through hole fixing element 430, the left side fixing element 410 and the right side fixing element 420 respectively, so as to arrange side-by-side cantilever shelves in the refrigerating compartment 2. Also, the connectors at the back of the cantilever shelves are fasteners, and may be fastened with the slots on the through hole fixing element 430, the left side fixing element 410 and the right side fixing element 420 respectively, thereby detachably mounting the cantilever shelves in the refrigerating compartment. A plurality of slots is arranged on the through hole fixing element 430, the left side fixing element 410 and the right side fixing element 420 at intervals in the vertical direction, such that the connectors are disconnected with the slots when the cantilever shelves are lifted up, and are fastened with the slots again after the cantilever shelves are moved up and down in the refrigerating compartment, thereby adjusting the heights of the cantilever shelves to be adapted to the food with different volumes. The refrigerator according to the present invention may realize the uniform lighting of the surface light source and side-by-side fixation of the cantilever shelves, and solve the problem of the super-wide refrigerator that its refrigerating compartment has nowhere to suspend and fix the side-by-side left and right shelves when the surface light source is arranged.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments may be combined properly to form other embodiments which may be understood by those skilled in the art.

A series of the detailed descriptions set forth above is merely specific description of feasible embodiments of the present invention, and is not intended to limit the protection scope of the present invention. Equivalent embodiments or modifications made within the spirit of the present invention shall fall within the protection scope of the present invention.

What is claimed is:

1. A surface light source assembly, provided in a refrigerating compartment of a refrigerator, comprising: a light source and a light guide plate which is vertically illuminated by the light source, wherein the light source is provided along a first side of the light guide plate; a plurality of light guide spots is provided at a front surface of the light guide plate, a through hole is vertically formed in the middle of the light guide plate, and comprises an upper edge close to the light source and a lower edge away from the light source; a first region is provided at a position of the front surface of the light guide plate close to the upper edge of the through hole, the diameter of each light guide spot in the first region is less than that of each light guide spot in the peripheral region of the first region, and the density of the light guide spots in the first region is less than that of the light guide spots in the peripheral region of the first region; a second region is provided at a position of the front surface of the light guide plate close to the lower edge of the through hole, the diameter of each light guide spot in the second region is greater than that of each light guide spot in the peripheral region of the second region, and the density of the light guide spots in the second region is less than that of the light guide spots in the peripheral region of the second region;

the diameter of each light guide spot in the first region gradually decreases in a direction away from the light source.

2. The surface light source assembly according to claim 1, wherein the diameter of each light guide spot in the second region gradually increases in a direction away from the light source.

3. The surface light source assembly according to claim 1, wherein the surface light source assembly further comprises a supplemental light source, the light guide plate comprises a second side opposite to the first side, and the supplemental light source is provided along the second side of the light guide plate.

4. The surface light source assembly according to claim 3, wherein the diameter of the light guide spots on the region, other than the first region and the second region, of the front surface of the light guide plate gradually increases in a direction away from the light source.

5. The surface light source assembly according to claim 3, wherein the density of the light guide spots on the region, other than the first region and the second region, of the front surface of the light guide plate gradually increases in a direction away from the light source.

6. The surface light source assembly according to claim 1, wherein the light guide plate further comprises a rear surface opposite to the front surface; the edge of the through hole is provided with a first anti-collision frame, and the first anti-collision frame extends from the edge of the through hole of the front surface of the light guide plate towards the through hole and covers the edge of the through hole of the rear surface of the light guide plate.

7. The surface light source assembly according to claim 1, wherein the light guide plate further comprises two third sides adjacent to the first side, and a second anti-collision frame is provided at the third sides in a lengthwise direction, and the second anti-collision frame extends from the edge of the front surface of the light guide plate towards the third sides and covers the edge of the rear surface of the light guide plate.

8. A refrigerator, comprising a refrigerating compartment, wherein the refrigerator comprises the surface light source assembly according to claim 1, the surface light source assembly mounted in the refrigerating compartment.

9. The refrigerator according to claim 8, wherein the refrigerating compartment further comprises at least two cantilever shelves arranged side by side, and a connector is provided at two ends at the back of the cantilever shelf respectively; the rear wall of the refrigerating compartment is provided with a through hole fixing element at a position corresponding to the through hole, and the rear wall is provided with a left side fixing element and a right side fixing element respectively corresponding to the two sides of the light guide plate; the connector at one end at the back of one of the cantilever shelves is connected to the left side fixing element, the connector at the other end is connected to the through hole fixing element; the connector at one end at the back of the other of the cantilever shelves is connected to the through hole fixing element, and the connector at the other end is connected to the right side fixing element, to mount the cantilever shelves in the refrigerating compartment.

10. The refrigerator according to claim 8, wherein the connector is a fastener, a slot is arranged on the through hole fixing element, the left side fixing element and the right side fixing element respectively, and the fastener may be fastened or disconnected with the slot.

11. The refrigerator according to claim 10, wherein a plurality of slots is arranged on the through hole fixing element, the left side fixing element and the right side fixing element respectively at intervals in the vertical direction; when the cantilever shelves are horizontally placed, the fasteners may be fastened to the through hole fixing element respectively, any one of the plurality of slots on the left side fixing element and the right side fixing element for limiting the vertical height of the cantilever shelves; when the front ends of the cantilever shelves are lifted up, the fasteners are disconnected with the slots, and the cantilever shelves are moveable vertically.

12. The refrigerator according to claim 10, wherein when the fasteners on the connector are mated and connected to the slots of the through hole fixing element, the sizes of the slots in the horizontal direction are larger than a sum of sizes of the fasteners in the horizontal direction.

* * * * *